Sept. 22, 1964     A. E. BRYMER, JR     3,149,950
APPARATUS FOR FORMING GLASS ARTICLES
Filed Sept. 8, 1960     9 Sheets-Sheet 1
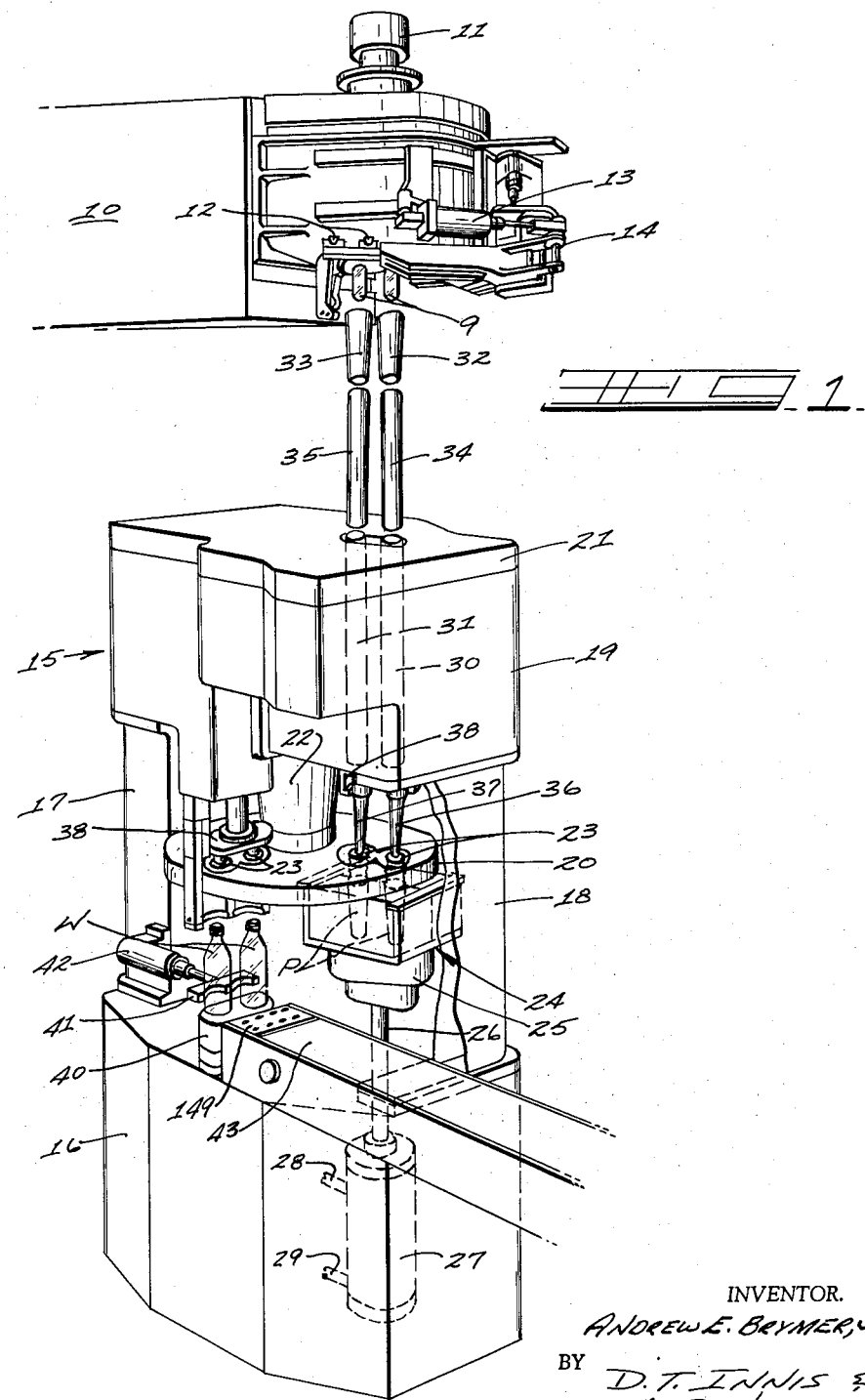
INVENTOR.
ANDREW E. BRYMER, JR.
BY D. T. INNIS &
J. R. NELSON
ATTORNEYS

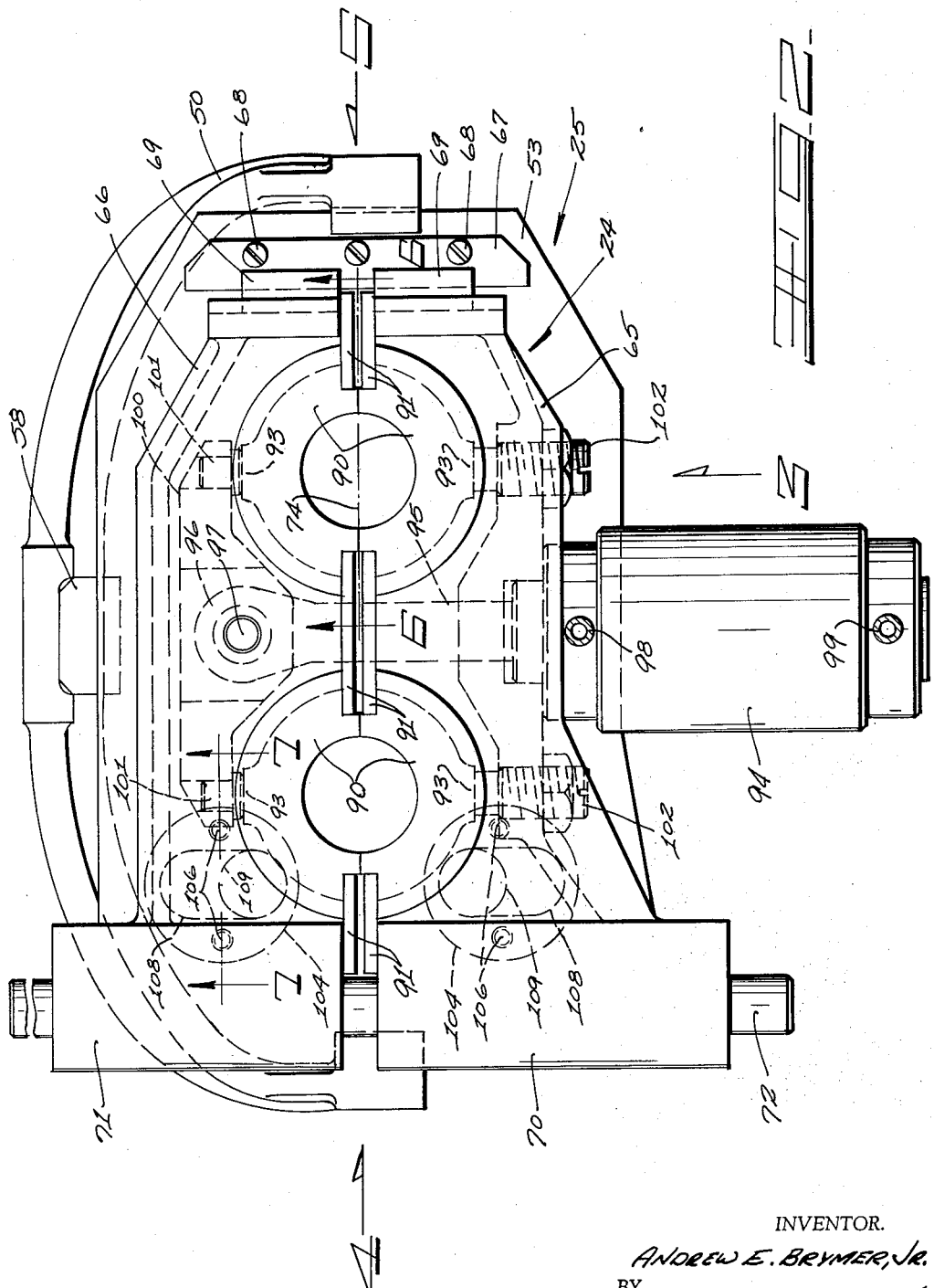

Sept. 22, 1964 A. E. BRYMER, JR 3,149,950
APPARATUS FOR FORMING GLASS ARTICLES
Filed Sept. 8, 1960 9 Sheets-Sheet 3
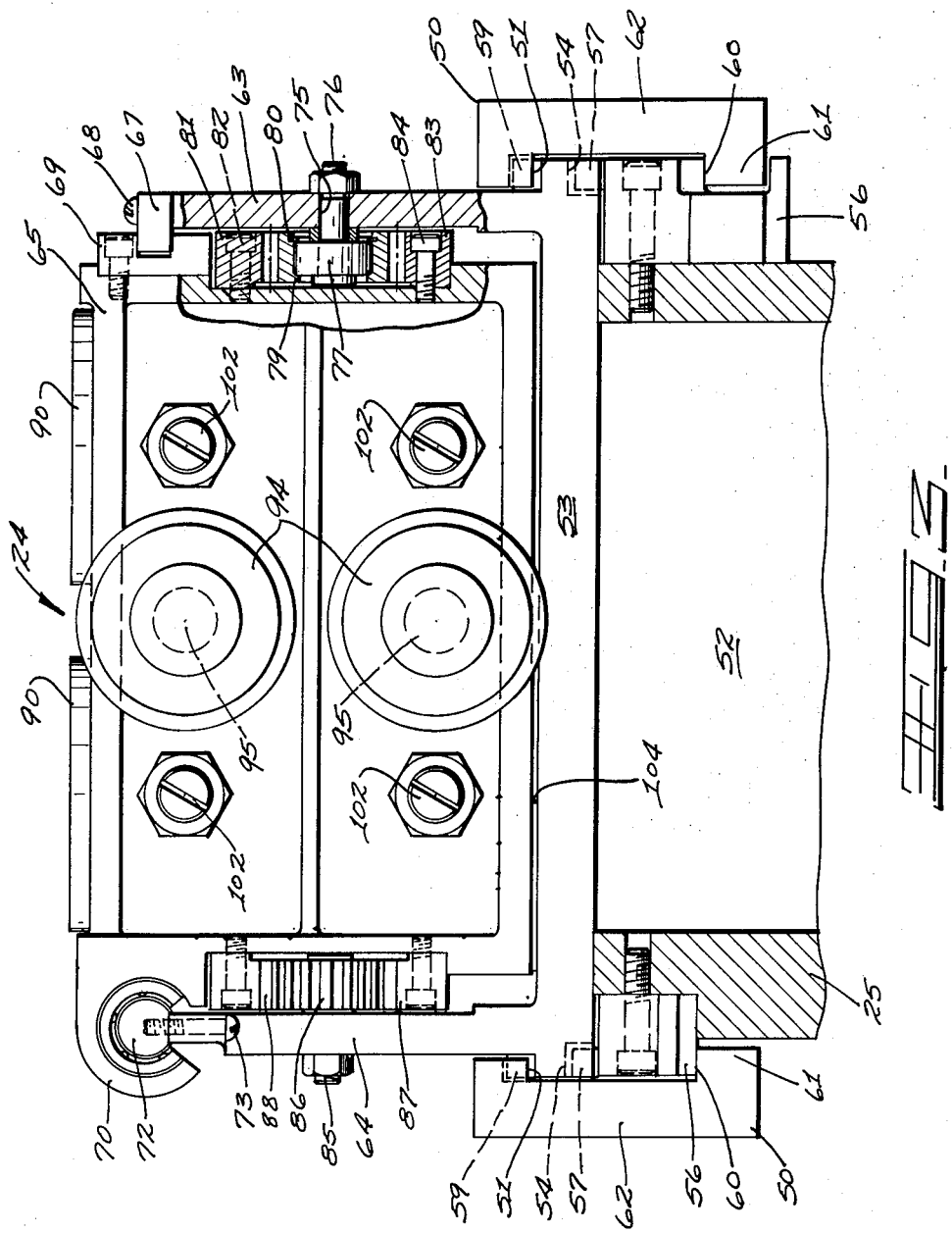
INVENTOR.
ANDREW E. BRYMER, JR.
BY
D. T. INNIS &
J. R. NELSON
ATTORNEYS

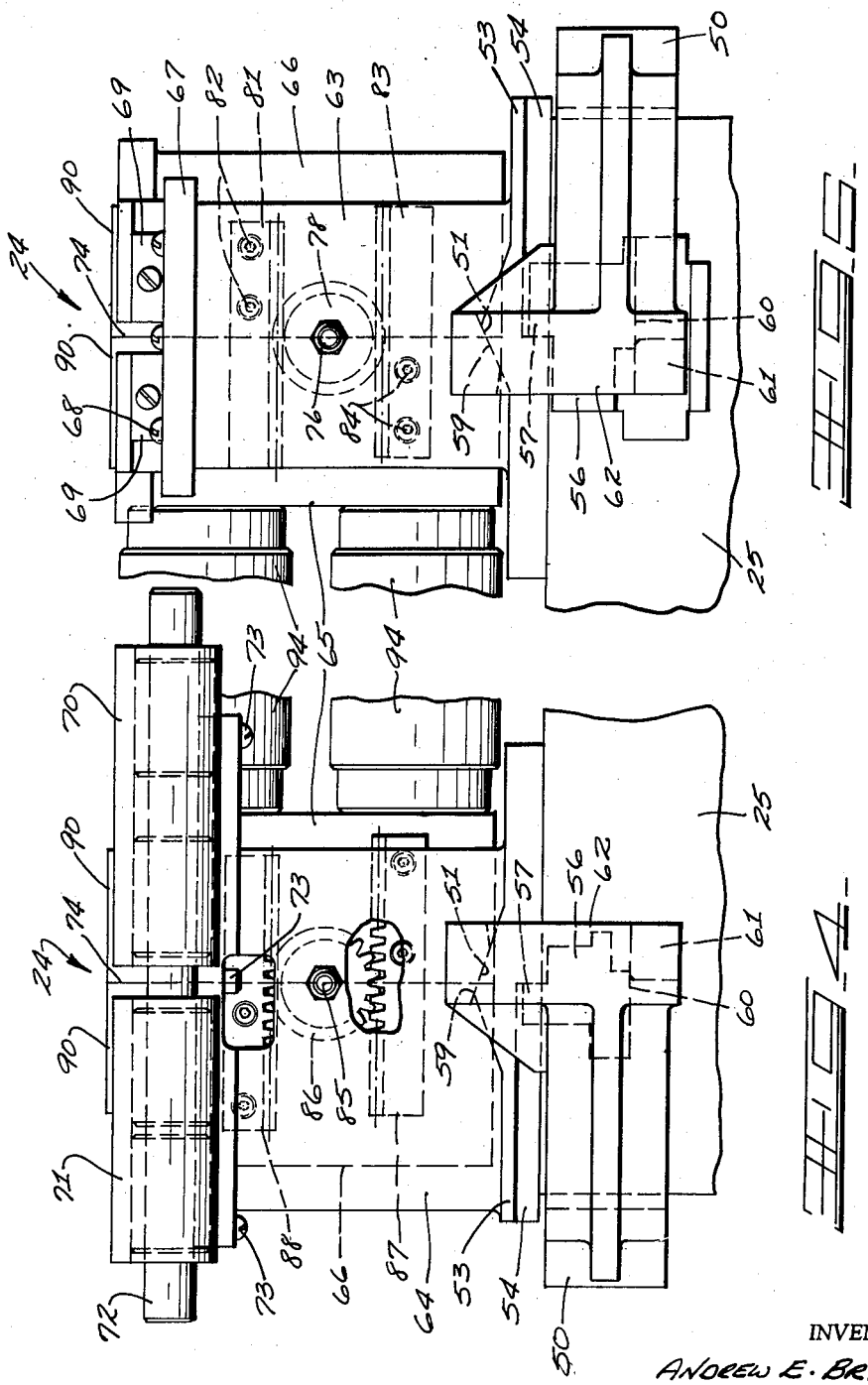

Sept. 22, 1964     A. E. BRYMER, JR     3,149,950
APPARATUS FOR FORMING GLASS ARTICLES
Filed Sept. 8, 1960     9 Sheets-Sheet 5
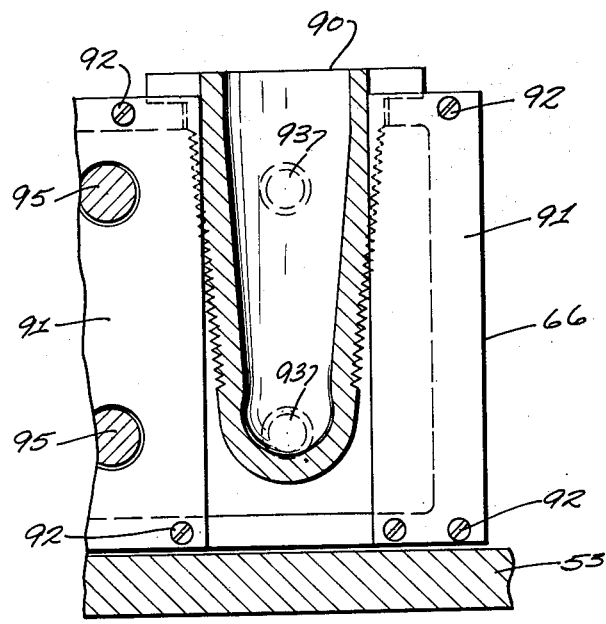
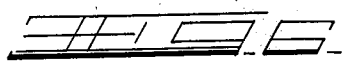
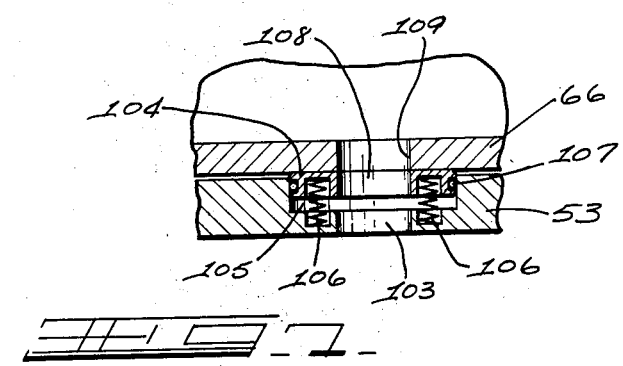
INVENTOR.
ANDREW E. BRYMER, JR.
BY D. T. INNIS &
J. R. NELSON
ATTORNEYS

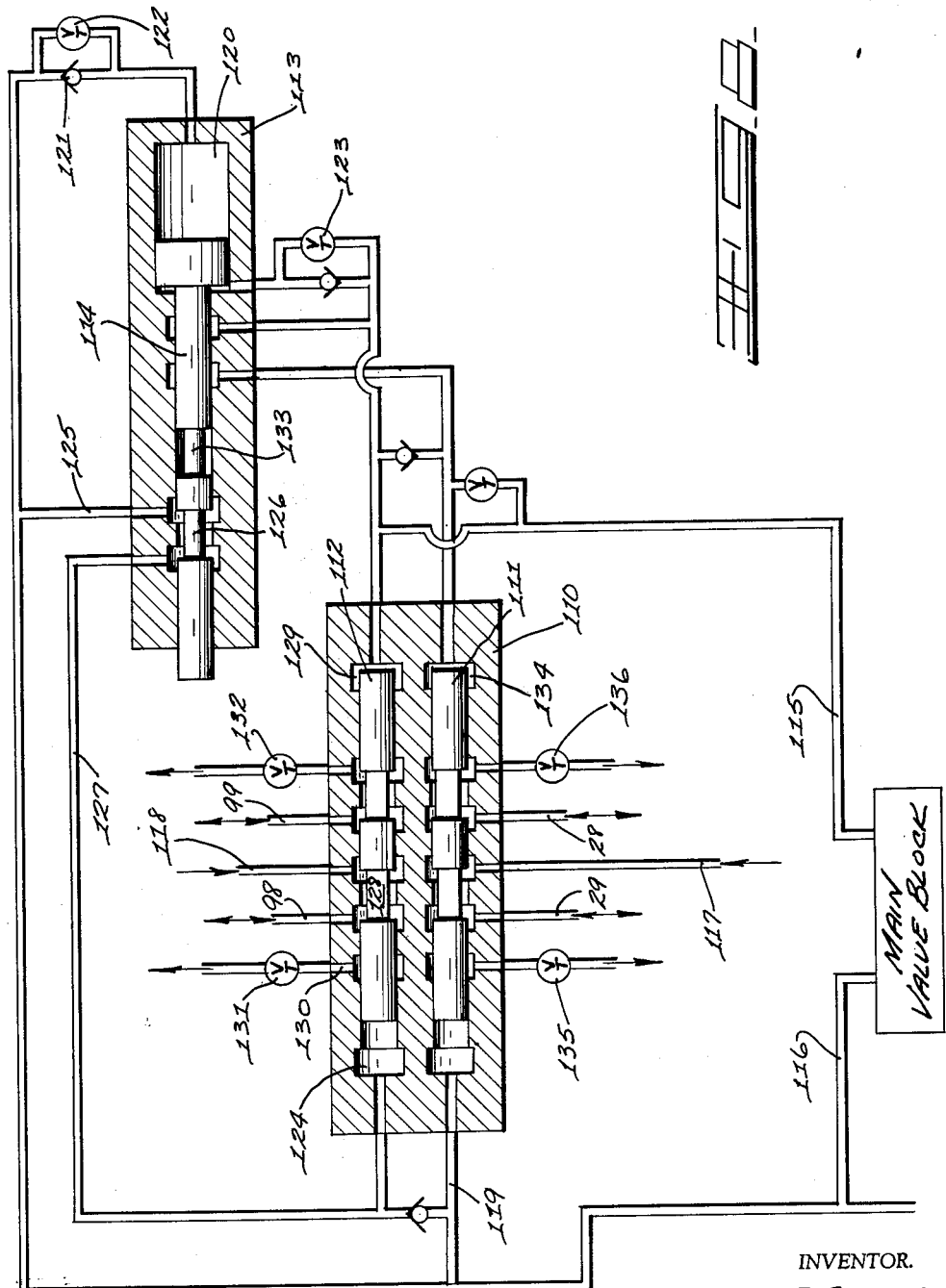

Sept. 22, 1964  A. E. BRYMER, JR  3,149,950
APPARATUS FOR FORMING GLASS ARTICLES
Filed Sept. 8, 1960  9 Sheets-Sheet 7
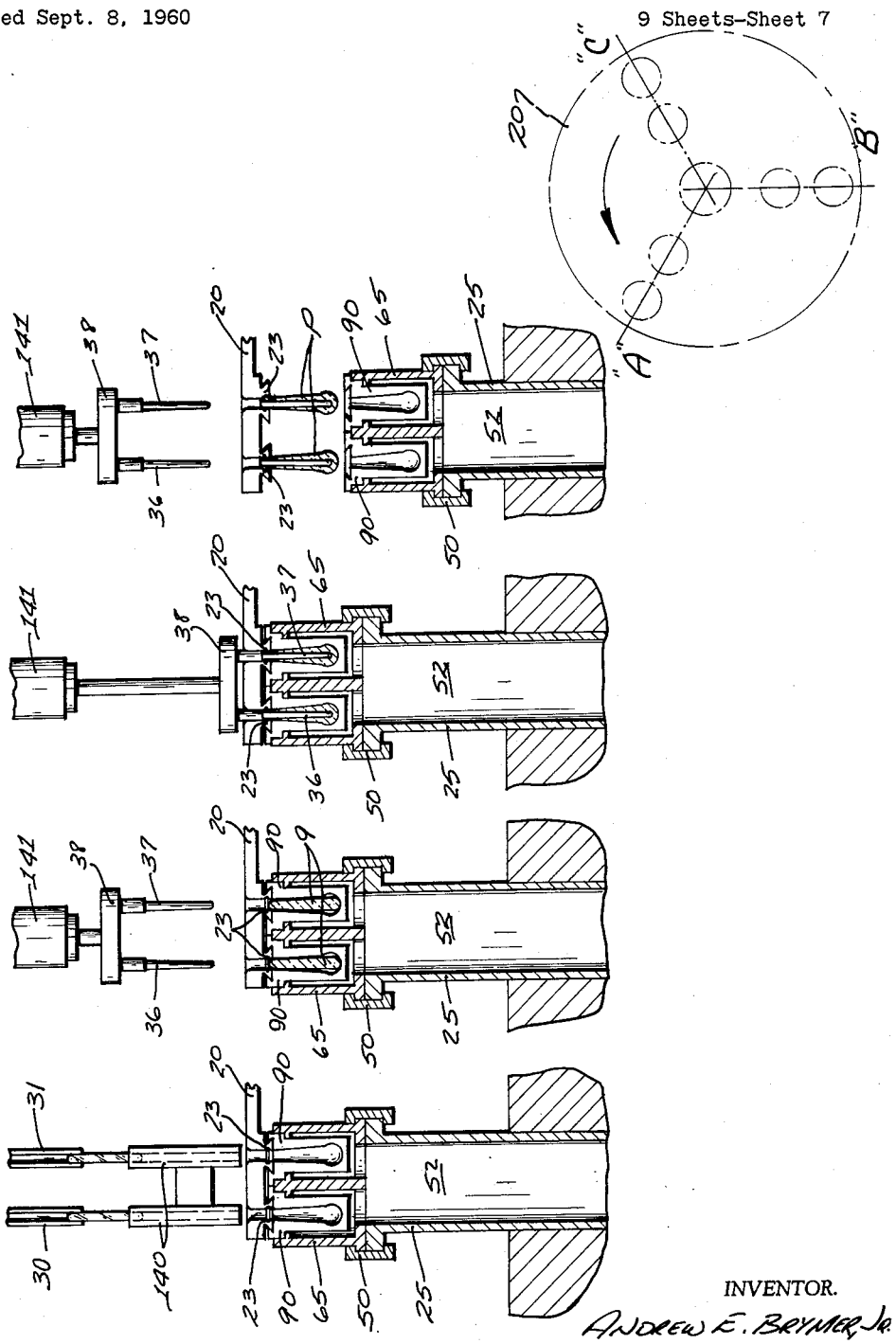
INVENTOR.
ANDREW E. BRYMER, JR.
BY
D. T. INNIS &
S. R. NELSON
ATTORNEYS Sept. 22, 1964  A. E. BRYMER, JR  3,149,950
APPARATUS FOR FORMING GLASS ARTICLES
Filed Sept. 8, 1960  9 Sheets-Sheet 8
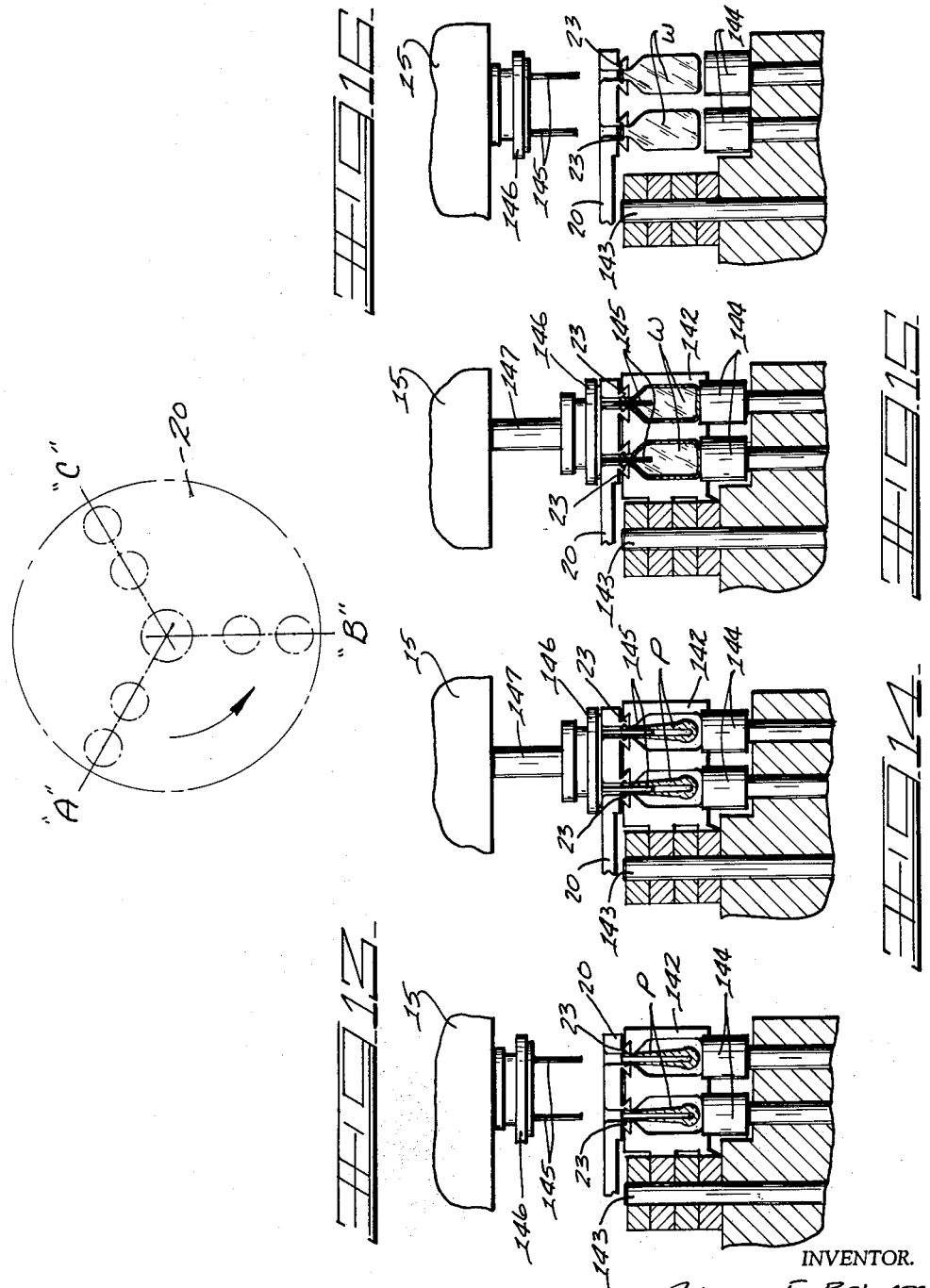
INVENTOR.
ANDREW E. BRYMER, JR.
BY D. T. INNIS &
J. R. NELSON
ATTORNEYS

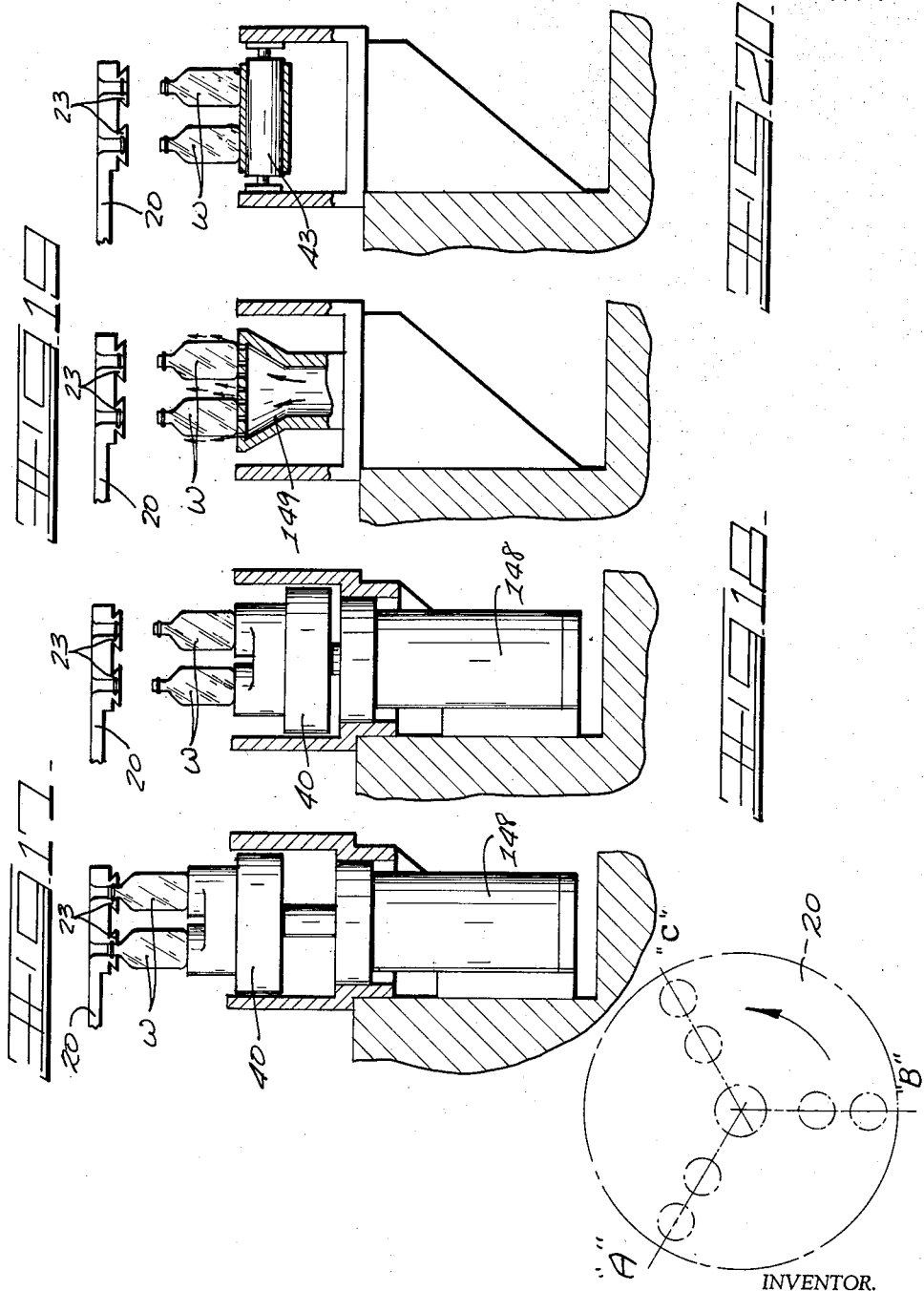

3,149,950
APPARATUS FOR FORMING GLASS ARTICLES
Andrew E. Brymer, Jr., Toledo, Ohio, assignor to Owens-Illinois Glass Company, a corporation of Ohio
Filed Sept. 8, 1960, Ser. No. 54,628
4 Claims. (Cl. 65—224)

This invention relates to glass forming and shaping mechanism and method, and in particular, to a parison or a blank forming method and mechanism for shaping parisons of the narrow-neck type. Such shaping may be either for forming parisons which are ultimately blown to final form or the forming of finally shaped narrow glass articles.

In present day machines of the gob fed type, it is the usual procedure to charge the mold by delivering the gob to the mold at a station preceding the pressing thereof or by charging the mold at the pressing station. It has been the practice in the forming of narrow-neck ware to charge the mold while in inverted position through the bottom opening of the mold disposed uppermost at the time of loading. The narrow-neck of the article will be formed at the lowermost portion of the inverted mold in partible neck rings or a neck mold registered adjacent the blank mold. After a baffle plate closes the mentioned uppermost opening of the mold, the plunger is moved vertically from below into the neck mold and the blank mold cavity. After the parison has been pressed, it has been necessary to invert the parison before completing the shaping of the article, which shaping is usually done by enclosing the parison in a blow mold and introducing air under pressure to the interior of the parison, through the opening in the formed neck finish of the article. Because of the fact that it is necessary to close the bottom of the parison mold with a baffle plate before pressing the parison, the final article will have what are termed "baffle marks" when in completed form.

In the present invention, the charge of molten glass is delivered to the parison mold through the neck mold, with the parison mold in a lower adjacent upright position. The parison mold is formed of two pieces so that the two halves may be opened and closed. When forming narrow-neck parisons in an upright position, a relatively large body of molten glass must be contained in the bottom portion of the parison mold and the mold cavity is comprised usually of a number of varying diameters, at least one of which is of greater diameter than the neck mold cavity. This relationship of mold diameters correlated to the ware formed from each mold will define the type of ware herein referred to as "narrow neck" ware. Consequently, it is necessary to use a split parison mold in order to separate the parison from the blank mold after the pressing of the parison has been completed. Furthermore, by providing a two-piece parison mold, this type of split parison mold does not require the use of a baffle. Hence, there is no possibility of having baffle marks on the finished ware.

In the present invention, the split blank mold is mounted for vertical movement into engagement with the neck ring parts carried by a horizontally rotated turret. The gob or mold charge is delivered to the closed parison mold when the mold is raised into underlying contact with the neck ring. The plunger mechanism, when actuated, moves the plunger from overhead into vertical alignment with the neck ring and then downwardly into the parison mold cavity. After the pressing is completed, the plunger is retracted, the parison mold opened, and the mold retracted. When there is sufficient clearance between the ends of the plunger and the neck rings and the open blank molds have been lowered below the end of the formed parison, the turret is ready to index to carry the parisons to the next station, namely, the blowing station. After the parison has been blown to final form, the turret is again indexed to carry the completed ware to the take-out station. By providing three sets of neck rings spaced 120° apart, it is possible to have full overlap of operation, that is, while the parison is being pressed a previously pressed parison is being blown to final form and a previously blown article is being discharged at the takeout station.

It is an object of this invention, therefore, to provide a novel glass forming machine and method for making narrow-neck glass articles.

It is an additional object of this invention to provide two-piece molding apparatus having positive linear motion in opening and closing.

It is a further object of this invention to provide a novel glass forming machine and method for forming narrow-neck parisons in an upright position.

It is still a further object of this invention to provide a new glass forming machine for forming narrow-neck containers, in which the entire forming cycle is performed in making the container, while the latter is disposed vertically and in an upright attitude at all times.

It is still a further object of this invention to provide a partible mold unit having linear opening and closing motion.

Other and further objects will be apparent from the following descriptive material taken in conjunction with the attached drawings, wherein:

FIG. 1 is a schematic isometric view of the glass forming unit of the invention;

FIG. 2 is a schematic plan view of the parison forming unit of the invention;

FIG. 3 is a side elevational view, partly in section, of the parison forming unit looking in the direction of arrow 3 on FIG. 2;

FIG. 4 is a schematic elevational view of the mold unit looking in the direction of arrow 4 on FIG. 2;

FIG. 5 is a schematic elevational view of the mold unit looking in the direction of arrow 5 on FIG. 2;

FIG. 6 is a cross-sectional view taken along line 6—6 of FIG 2;

FIG. 7 is a cross-sectional view taken along line 7—7 of FIG. 2;

FIG. 8 is a schematic diagram of the hydraulic circuit for operating the parison molds;

FIGS. 9 to 12 are schematic cross-sectional elevational views illustrating the sequence of operation of the mechanism at the pressing station;

FIGS. 13 to 16 are schematic cross-sectional elevational views of the mechanism illustrating the sequence of operations at the blow station;

FIGS. 17 to 20 are schematic elevational views partly in section illustrating the sequence of operation performed at the takeout station.

The accompanying drawings illustrate the present invention as a mechanism for use in a plural mold, double gob, operation in the pressing of glass articles, or parisons for blown containers. However, this invention is not to be limited to use in double gob operation as its principal features may also be applied to single mold and single gob operation. In addition, this invention is also applicable to the pressing of finished glass articles in either a single or double cavity pressing operation.

Additionally, the invention contemplates a method of forming hollow glass articles having restricted neck openings comprising the steps of closing a set of mold halves to form a parison forming cavity, feeding a charge of molten glass through neck molds and into said cavity, pressing the charge by a downwardly applied pressing force transmitted through pressing plunger reciprocation through the neck mold, opening the mold halves with respect to the pressed parison while supporting the parison in pendant form from the neck mold and laterally transferring the pendant parison to a blow station while retained in the neck molds, expanding the parison into final article form at the blow station, again transferring the article to a third station and releasing the article from the neck molds at a third station.

As illustrated in FIG. 1, there is the well-known glass feeder 10 of the double gob type. Said feeder is arranged to simultaneously deliver a plurality of gobs 9 of plastic and workable glass to gob guides, portions of the latter being vertically disposed with their longitudinal axis in side-by-side arrangement.

The feeder 10 has a reciprocable plunger 11 and the usual double blade cutting shears 12 actuated by a hydraulic cylinder 13 through suitable linkage 14. A forming machine, generally designated 15, is positioned beneath the feeder 10. The forming machine 15 is comprised of a base 16 with vertical uprights 17 and 18 connected to the top of the base 16. The uprights 17 and 18 support an upper structure 19 which is the structural part of the machine containing the drive mechanism for a rotatable turret 20.

The upper structure 19 has an overlying cover member 21 to prevent the intrusion of foreign matter into the mechanism. Extending downwardly from the member 19 is a vertically disposed bearing bracket 22 arranged to support a vertical shaft upon which is mounted the turret 20. The turret 20 carries or supports a plurality of sets of neck molds 23, each set being equally spaced circumferentially thereof, and the turret is arranged to transport these neck molds 23 from the forming station to a blowing station and then to a ware takeout station in succession.

A parison mold molder 24, also referred to in the trade as a mold cage, is located at the forming station and is arranged for vertical reciprocation into and out of contact with the neck molds 23 on the turret 20. The parison mold cage 24 is split radially of the turret and each half carries a pair of parison mold halves. The parison mold cage is carried by a crosshead 25 which in turn is attached to the upper end of a vertically disposed piston rod 26. The piston rod 26 is arranged for reciprocation by a vertical cylinder 27 whose operation is controlled by the introduction of fluid under pressure through the conduits 28 and 29. Introduction of fluid through conduit 29 and exhaust through conduit 28 will raise the mold cage 24, whereas introduction of fluid through conduit 28 accompanied by the exhaust of fluid through conduit 29 will lower the mold cage 24.

In order to provide efficient charging of the blank molds, fixed gob guiding means 30 and 31 extend vertically through the upper machine member 19. As charges 9 are formed through the cooperative use of the feeding mechanism 10, they will be guided by funnels 32 and 33 and deflectors 34 and 35 into the open upper ends of the guides 30 and 31. The lower end of the guides 30 and 31 are in vertical alignment with a pair of neck molds 23 at the pressing station and after delivery of the charges into the mold cage 24, a pair of plungers 36 and 37 mounted for horizontal movement by means of a guideway 38 on the under surface of the upper structure 19 are moved from a remote position out of alignment with the neck rings into a position vertically above the neck rings at which time they are moved in a downward pressing direction to press the charges within the mold cage 24.

As stated before, after the pressing has been completed, the plungers 36 and 37 are retracted upwardly until their lower ends clear the neck rings 23, and simultaneously the parison mold cage 24 is opened and lowered until the formed parisons P, which depend from the neck rings 23, will have sufficient indexing clearance to pass over the surface of the parison mold cage 24. The turret is then indexed 120° carrying the upright parisons to the next station where a blow mold (not shown) is closed about the parisons and the parisons are blown to final form. The blow mold is then opened and the turret again indexed 120° bringing the formed articles to a takeout station. At the takeout station, a vertically moveable transfer and cooling head 40 is elevated until in contact with the bottom surface of the formed articles at which time the neck rings 23 are opened to release articles W to the transfer head 40. The transfer head 40 is then retracted to lower the articles so that a suitable horizontal transfer means 41, actuated by a hydraulic cylinder 42, will move the articles from the transfer head 40 to a wind box 149 and then to a continuously moving horizontal belt conveyor 43. The conveyor 43 carries formed articles W away from the forming machine to the next operation, usually an annealing lehr where the article is heat treated under controlled conditions.

Referring now to FIGS. 2 to 7, a detailed disclosure of the split mold cage and mounting arrangement is presented. As best shown in FIGS. 2 to 5, the mold cage assembly 24 is clamped to the moveable crosshead 25 by means of a yoke shaped clamp 50 (FIGS. 4 and 5) having clamping faces 51 at opposite ends thereof. The crosshead 25, to which the mold cage 24 is clamped, is a generally hollow cylindrical member serving as a cooling air passage 52 for bringing cooling air to the mold cage 24. The top of crosshead 25 is closed by a base member 53, for supporting the mold cage assembly 24, and the base member 53 is a generally horizontal member having undercut slots 54 (FIGS. 4 and 5) extending along opposite edges thereof to a point midway of the width thereof.

These slots 54 provide guiding surfaces when the mold cage and supporting base member are applied to the crosshead 25. A pair of members 56, bolted to opposite sides of the crosshead 25, having portions 57 that extend above the top surface of the crosshead 25 and serve as centering and guiding members in cooperation with the slots 54 in the supporting base 53. The portion 57 of the element 56 limits the positioning of the mold cage supporting base 53 with respect to the crosshead to a fixed horizontal position.

Screw means (not shown) threaded in and extending through the crosshead 25 is adapted to have a head loosely coupled to a bearing plate 58 (FIG. 2) at the central portion of the yoke-shaped clamp 50 and serves to force the clamp in an outward direction thus causing the clamping faces 51 to engage angular clamping surfaces 59 at opposite sides of the mold cage base 53. As can be seen in FIGS. 4 and 5, these clamping surfaces 59 are directly above the portions 57 of the members 56 when the mold support 53 is tightly clamped to the crosshead. The members 56 have additional camming surfaces 60 which overlie beveled corners of inwardly extending portions 61 at the ends 62 of the yoke-shaped clamp 50.

Thus, it can be seen that upon the application of a force to move the yoke clamp 50 in a direction away from the crosshead 25, the clamping faces 51 of the inwardly extending part of the clamp end 62 will abut the surfaces 59 of the base 53 and at the same time the beveled corners of the lower, inwardly extending portions 61 of the clamp ends 62 will underlie the surfaces 60 of the members 56. Thus, by applying force to the plate 58 of the yoke clamp 50, the mold cage base 53 is firmly held against both horizontal and vertical movement relative to the crosshead 25. Removal of the mold cage 24 from the crosshead 25 is accomplished by drawing the yoke in an inward direction to the extent necessary for the inwardly extending portions 61, at the end 62 of the clamp 50, to move out of engagement with the surface 60 on the member 56. This movement allows the ends 62 of the clamp 50 to then be moved vertically a sufficient amount to permit the face 51 to pass over the beveled surface 59 and thus allow the mold cage support 53 to slide across the top of the crosshead 25 and be removed therefrom.

The base member 53, has a pair of parallel vertical upstanding walls 63 and 64 at opposite ends thereof adjacent the clamping surfaces 59. The vertical walls 63 and 64 with the base 53 form a generally U-shaped bracket which serves as the mounting structure for the two blank cage halves 65 and 66. The blank cage halves separate along a vertical plane 74 normal to the walls 63 and 64.

A bearing plate 67 is fastened to the upper edge of the wall 63 by means of suitable fastening elements 68. The bearing plate 67 extends beyond the width of the wall 63 and has a portion, throughout its length, which extends beyond the inner surface of the wall 63. The mold cage halves 65 and 66, adjacent the upper edge thereof, carry C-shaped bearing members 69 adapted to embrace the inwardly extending portion of the bearing plate 67, thereby supporting one end of both mold cage halves 65 and 66 for relative movement with respect to the base 53.

The opposite end of the mold cage halves 65 and 66 are provided with "ball bushings" 70 and 71. These "ball bushings" are available as a standard item manufactured by Thomson Industries, Inc., Manhasset, New York. The "ball bushings" are fastened to the respective mold halves 65 and 66. These "ball bushings" are of a type that allows substantially frictionless axial movement thereof with respect to a fixed shaft 72 forming the inner race for the bearings.

The horizontal shaft 72 is fixed to the vertical wall 64 by means of suitable fastening means 73. As shown in FIG. 3, the ball bushings 70 and 71 are open along their length at the bottom thereof to accommodate the fastening means 73 and to allow relative movement of the ball bushings with respect to the shaft 72. Thus, it can be seen that the mold cage halves 65 and 66 are mounted for movement relative to the walls 63 and 64 and the base 53 by means of the described bearings provided at both ends thereof.

In order to insure that the mold cage halves 65 and 66 will open and close on the same vertical plane, means are provided for insuring linear motion of the mold cage halves 65 and 66 in opposite directions relative to the mold parting plane 74. The means for insuring equal opening and closing motion of both cage halves takes the form of rack and pinion interconnections between the mold cage halves.

Wall 63, as best shown in FIG. 3, has an opening 75 therethrough whose axis is coincident with the parting plane and is adapted to receive a stub shaft 76. The inner race of a bearing member 77 is fixed to the shaft 76 and the outer race thereof carries a pinion gear 78 for rotation about the axis of the shaft 76. The pinion 78 has an annular internal shoulder 79 against which the outer race of bearing 77 abuts and a retainer ring 80 holds the bearing in engagement with the shoulder 79. The pinion 78 is in mesh with a rack 81, fixed to mold cage half 66 by means of suitable fastening means 82. A second rack 83 is fixed to the mold cage half 65 by means of suitable fastening means 84 and is in engagement at the under side of the pinion 78.

Thus, it can be seen that upon movement of one mold cage half, such motion will be transmitted by means of its associated rack, to the pinion 78 and in turn to the rack fixed to the other mold half. This insures equal and opposite motion to the respective mold cage halves.

A substantially identical rack and pinion arrangement is provided for the opposite end of the mold cage. As can be seen in FIG. 3, a stub shaft 85 is fastened to the wall 64 and serves as the supporting member for pinion 86 which is in engagement with a pair of racks 87 and 88 in the same manner as described above with respect to pinion 78 and associated racks 81 and 83. By providing racks and pinions at both ends of the mold cage halves, positive relative linear movement is assured for both mold cage halves 65 and 66. Furthermore, equal opening and closing motions will be assured for each individual mold.

The mold cage halves 65 and 66 are open at the top thereof and provide recesses for supporting parison mold halves 90 in abutting relationship (FIG. 2). The parison mold halves 90 are retained in position within the mold cage halves 65 and 66 by means of mold keepers 91 which are fastened to the mold cage halves 65 and 66 by means of screws 92, as best shown in FIG. 6.

The rear wall of each parison mold half 90 is formed with a pair of abutments 93 (FIGS. 2 and 6) which serve as surfaces against which mold closing and retaining forces are applied.

The arrangement for opening and closing the parison mold cage halves 65 and 66 along with the parison mold halves 90 takes the form of a pair of hydraulic piston and cylinder motors 94 which are mounted on the mold cage half 65. The hydraulic motors 94 have output shafts whose operating ends 96 embrace a vertical shaft 97 which is fixed within the mold cage half 66. Operating fluid for the hydraulic cylinder 94 may be introduced through ports 98 and 99, it being understood that the introduction of fluid under pressure through port 99 will cause the mold cage halves to separate and the introduction of fluid under pressure to the port 98 will cause the mold cage halves 65 and 66 to close.

Provision is made for insuring equal closing force application to the parison mold halves 90 retained in mold cage 66 and takes the form of a rocker arm 100 mounted at its center for horizontal oscillation with respect to the shaft 97 (see FIG. 2). The outer ends of the rocker arm 100 carry adjustable bearing pads 101 which are adapted to engage the abutments 93 of the parison mold halves 90 which are retained within the mold cage half 66. The opposite parison mold halves 90, which are retained in the mold cage half 65 are fixed with respect to movement therein by means of adjustable studs 102 which bear on the abutments 93 thereof.

While this description has been limited to the arrangement of a single output shaft 95, single rocker arm 100 and bearing pads 101, it should be pointed out that there are two sets of these elements within the mold cage half 66, one positioned below the other and each aligned with a motor 94.

Referring specifically to FIG. 7, there is shown an arrangement for introducing the cooling air into the interior of the blank mold cage half 66. The cooling air is brought into contact with the under surface of the member 53 through the conveyance of air through the passage 52 in the crosshead 25 (FIG. 3). Communication is provided between the air in contact with the bottom surface of the member 53, and the chamber 103 located within the base member 53.

In order to allow relative movement between the mold cage 66 and base member 53, there necessarily must be some clearance. The details of FIG. 7 show the sealing arrangement for preventing leakage of coolant air out through the clearance between the blank mold cage 66 and the base member 53, prior to entry of the air into the mold cage surrounding the mold halves 90.

An annular disk shaped element 104 fits within a circular recess 105 in the base 53 and is biased in an upward direction by means of springs 106. This annular member 104 is in sealing engagement with the interior walls of the recesses 105. This sealing engagement is assured by the utilization of an O-ring 107 surrounding the periphery of the member 104. The annular member 104 is provided with an elongated opening 108 therethrough and communicates with a circular opening 109 in the bottom of the mold cage 66. As best illustrated in the dotted outline on FIG. 2, the circular opening 109 remains in communication with the elongated opening 108 during opening and closing of the mold cage halves. While FIG. 7 illustrates one of the cooling fluid connecting means, a second substantially identical cooling fluid connecting arrangement is also provided for the introduction of coolant into the mold cage 65. The same reference numerals have been applied to the second cooling arrangement illustrated in FIG. 2, it being understood that the opening 109 will be positioned so as to always be in communication with the opening 108.

Upon the introduction of cooling fluid into the mold cages 65 and 66, the coolant will flow in surrounding relationship with respect to the parison mold halves 90 and be exhausted through the bottom of the mold cage halves along the parting line thereof inasmuch as the mold cage halves 65 and 66 do not actuatlly come into sealing contact with each other when the mold cages are closed. This is true because the parison mold halves 90, when in sealing engagement, extend beyond the plane of the keepers and prevent the mold keepers from coming into contact with each other.

The forces exterted by the hydraulic cylinders 94, when holding the parison mold halves together to form the parison mold cavities, are equalized as between the two cavities by reason of the fact that the arm 100 is mounted for pivotal movement with respect to the pin 97. Thus, whatever force is applied to maintain one set of molds closed will also necessarily be used to maintain the other set of molds closed.

Referring now to FIG. 8, there is shown a schematic hydraulic diagram illustrating the operational control circuit for raising and lowering the blank molds and for opening and closing the blank molds.

A valve block 110 contains two axially shiftable valve members 111 and 112 and a second valve block 113 contains an axially shiftable valve member 114. Operating fluid for shifting the valve members in a preselected time sequence is supplied from the main valve block through conduits 115 and 116 alternatively. The operating fluid for raising the blank cage assembly is supplied through conduit 117 and the operating fluid for opening and closing the mold cage is supplied through conduit 118. Both conduits 117 and 118 are connected to a suitable source of hydraulic fluid under pressure. The position of valve 111 controls the supply of fluid from the conduit 117 to the two conduits 28 and 29 which in turn are connected to opposite ends of the raising and lowering cylinder 27. The position of valve 112 controls the application of hydraulic fluid to the motors 94 by controlling the connection between conduit 118 and the two conduits 98 and 99 connected to opposite ends of the motors 94. It should be understood that the conduits 98 and 99 are each connected to both motors 94 for effecting opening and closing movement of the blank mold cage halves.

The valve 114, has, as its primary function, the control of the sequence of application of the two working fluids which affect the blank station operations, namely, opening and closing the molds, and raising and lowering the molds. The valve, in effect, is a delay means for allowing one of the above operations to be initiated before the other operation becomes effective.

The following is a description of the operation of raising the blank molds and closing the blank molds. The main valve block, which is under control of the machine timer, feeds oil under pressure through conduit 116 which is connected to the valve block 110, at one end of valve 111 by means of a branch conduit 119. Shifting of the valve 111 to the right, as shown in FIG. 8, will allow communication of fluid under pressure from the conduit 117 to the conduit 29 resulting in the raising of the blank mold assembly. Conduit 116 is also connected to one end of a piston chamber 120 formed within valve block 113 through a check valve 121 and a throttle valve 122 connected in parallel.

The introduction of fluid under pressure to the piston chamber 120, of the valve block 113, will cause the shifting of the valve 114 to the left to a position shown in FIG. 8. The rate at which the valve 114 is shifted is controlled by a setting of a throttle valve 123 connected to the exhaust side of the piston chamber 120. When the valve 114 has been shifted to the left, fluid in conduit 116 may reach chamber 124 in valve block 110 at the left end of valve member 112.

As can be seen, oil will flow through the line 116 to branch line 125 through the valve block 113, past the relieved portion 126 of valve 114 and through the conduit 127, to chamber 124, resulting in a shifting of the valve 112 to the right, as shown.

With valve 112 positioned to the right, as shown, in FIG. 8, fluid under pressure in line 118 will flow past reduced portion 128 of valve 112 into the line 98 resulting in a closing of the blank mold cage. The blank mold cage when closed, is ready to receive mold charges.

When the mold charges have been pressed and the period of dwell completed, the main valve block will shift the application of fluid under pressure from the conduit 116 to conduit 115 and exhaust the conduit 116. Application of fluid under pressure through the conduit 115 will immediately cause shifting of the valve member 112 to the left by reason of the introduction of fluid under pressure to chamber 129 in valve block 110 at the right end of valve member 112. Fluid under pressure from the line 115 is also introduced to the left end of the chamber 120, resulting in a shifting of the valve 114 to the right. The rate of movement of the valve 114 is controlled by the setting of the throttle valve 122 which now is in the exhaust side of the system and is connected across a check valve 121 in the conduit 116. Shifting of the valve 112 to the left allows the introduction of fluid under pressure from the conduit 118 to reach conduit 99, connected to the motor 94 to open the blank mold cages 24.

Furthermore, the relieved portion 128 of the valve 112 will now connect the conduit 98 to an exhaust port 130 in valve block 110. This exhaust port 130 is connected to a sump or other suitable collecting means through a throttle valve 131. Adjustment of the throttle valve 131 will control the rate of exhaust of fluid from the motor 94 and serves as a means for controlling the rate of opening of the blank cage. A similar throttle valve 132 provides a rate control for the exhaust of fluid from motor 94 when operating in the opposite direction when the conduit 99 is connected to a sump through the valve 132.

After the valve 114 has been shifted to the right, the relieved portion 133 thereof will allow communication between the pressurized fluid in conduit 115 and the chamber 134 in valve block 110 at the right end of valve 111. The introduction of pressure fluid to chamber 134 will result in a shifting of the valve 111 to the left. Shifting of the valve 111 to the left will connect the motor 27 through conduit 29 and throttle valve 135 to a sump or suitable collecting means.

Furthermore, fluid under pressure in the conduit 117 will be in communication with the conduit 28 resulting in lowering the blank mold cage. A throttle valve 136 is also provided in the exhaust from conduit 28 and motor 27, and may be adjusted to control the rate of elevating the blank mold cage in the same manner that valve 135 may be adjusted to regulate the rate of lowering the mold cage.

Referring to FIGS. 9 to 12, there is shown a schematic sequence of the operations being carried out at the pressing or parison forming station A. FIG. 9 illustrates the position of the parison forming molds 90 with respect to the turret 20 when in position to receive the severed gobs 9 therein. The gobs 9 are guided from above through stationary gob guides 30 and 31 which direct the gobs in a vertically downward relationship in alignment with the neck rings 23 carried by the turret 20. In order to insure that the gobs 9 remain vertical in passing from the ends of the guides 30 and 31, and prior to their entry into the neck rings 23, additional auxiliary gob guides 140 are positioned above the turret 20 in alignment with the neck rings 23 and stationary gob guides 30 and 31. These auxiliary guides 140 are mounted for movement into and out of this aligned path and after the gobs have been delivered to the molds 90, the gob guides 140 are moved laterally so as to provide sufficient clearance for the movement of the plungers 36 and 37 into position directly above the molds 90. As can be seen by examination of FIG. 9, the severed gobs 9 are relatively long and small in cross-section, thus requiring the positioning of these auxiliary gob guides 140 in the area of free fall of the gobs from the lower ends of guides 30 and 31 in order to maintain the longitudinal axis vertical and to insure that the gobs 9 will pass through the neck rings 23 and be deposited in the molds 90. In the position shown in FIG. 9, the molds 90 are closed to form the parison forming cavities.

FIG. 10 is a schematic view illustrating the next step in forming narrow-neck parisons. In FIG. 10, the gobs have been received in the cavities, formed by closed molds 90 and the plungers 36 and 37 have been moved in slideway 38 so as to be positioned in axial alignment with the neck rings 23.

The next step is illustrated in FIG. 11 wherein the plungers 36 and 37 have been advanced into the neck rings and cavities in the molds 90. The plungers are actuated by a hydraulic motor 141 which serves to advance both plungers into the pressing position shown in FIG. 11.

Moving now to FIG. 12, there is illustrated the arrangement of the parts of the machine at the pressing station when the parison has been completely formed. In this view, the plungers 36 and 37 have been retracted from the neck rings 23 and out of the turret 20. At the same time that the plungers are retracted, the molds 90 are opened by the mechanism previously described and, after being opened, are lowered to the position shown in FIG. 12. As can readily be seen, the formed parisons P remain fixed at their upper ends in the neck rings 23 and are pendant from the neck rings retained in the turret 20. At this time the turret 20 is indexed 120° bringing the parison to the position B shown in FIG. 13 wherein the parisons P are enclosed by a finishing or blow mold 142, mounted for swinging movement on the pin 143. The finish molds 142 are double cavity so as to enclose a parison in each cavity. At the time that the finish mold 142 is closed, a pair of bottom plates 144 are moved vertically upward to close off the bottom of the blow molds 142. Positioned above and in alignment with the neck rings 23 when positioned at the blow station are a pair of nozzles 145 carried by a blow head 146. The blow head 146 is mounted for vertical reciprocation by means of a shaft 147, movable into and out of the upper support 15.

FIG. 14 illustrates the lowering movement of the blow head 146 at which time the nozzles 145 project into the interior of the hollow parisons P.

FIG. 15 illustrates the next step, which is the application of air under pressure to the interior of the parisons P to expand the parisons into contact with the interior of the blow molds 142, thus forming finished narrow neck containers or bottles W.

FIG. 16 illustrates the next sequence of operation in the forming of the bottles wherein the blow head 146 is retracted, moving the nozzles 145 vertically upward out of the interior of the bottles and neck rings 23. At the same time, the blow molds 142 are opened and the bottom plates 144 are retracted. At this stage of the operation the bottles have been completely formed but are still in a somewhat plastic state and are still confined in the neck rings 23, carried by the turret 20. With the mechanism at the blow station B arranged as shown in FIG. 16, the bottles W are ready to be laterally transferred by means of the neck rings 23. At this time the turret 20 is again indexed 120° and will carry the bottles W to the take out station C which is schematically illustrated in FIGS. 17 to 20. The sequence of operation taking place at the takeout station C is illustrated in FIGS. 17 to 20.

Referring particularly to FIG. 17, the bottles W are shown still retained in the neck rings 23. At the takeout station, the transfer head 40 is elevated by a motor 148 until the upper surface thereof is in close proximity to the bottom of bottles W, at which time the neck rings 23 are opened to release the bottle to the transfer and cooling head 40.

As illustrated in FIG. 18, the head 40 is lowered, thus providing clearance between the necks of the bottles and the open neck rings 23. At the same time that the transfer head 40 is lowered, suitable horizontal transfer means 41, shown in FIG. 1, are moved into position behind the bottles W and when operated will slide the bottles off of the head 40 onto a wind box 149 to provide additional cooling to the bottom of the bottles and insure that they are sufficiently cooled to be handled without danger of being deformed. The positioning of the bottles on the wind box 149 is illustrated in FIG. 19.

After the bottles have been sufficiently cooled, they are again moved laterally by the horizontal transfer means 41 and moved onto the continuously moving belt conveyor 43, which will carry the bottles away from the forming machine for subsequent heat treating.

In summary, it can be seen that the disclosed apparatus will provide a compact arrangement for forming narrow neck containers wherein the mold charges are delivered through the neck rings into the closed two-piece parison mold.

Furthermore, the pressing of the parison is provided by movement of the plungers through the neck rings and upon retraction of the plungers, opening of the parison molds, and their subsequent lowering, the parisons may be transferred laterally to a blow station where they may be blown to final form. The advantage of loading through the neck ring is apparent from the fact that it is possible to use a parison mold formed of only two sections. The advantage of a two section parison mold for narrow neck ware is the elimination of baffle marks which are present when parison molds are loaded in an inverted position and pressed from below.

It is also apparent from the above description that complete overlap of operation in the two forming steps and the discharge step is possible and results in the ability to increase production. The forming operations illustrated in FIGS. 9 to 12 take place at the pressing station A while previously pressed parisons P are being formed into finished ware by the finishing operations illustrated in FIGS. 13 to 16 at the blow station B, and finished articles or bottles W are being removed from the apparatus at station C as illustrated in FIGS. 17 to 20.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. Narrow neck ware forming apparatus comprising a base, a horizontal rotatable turret, at least two sets of neck molds mounted on said turret above said base and circumferentially spaced thereon corresponding to the operating stations of said apparatus, a two-piece split narrow neck parison mold adapted to open and close in vertical alignment with one of said sets of neck molds, vertically positioned first motor means mounted on said base and supporting said parison mold, second motor means connected to said parison mold for opening and closing said mold, means connected to said first motor means for selectively actuating it to reciprocably raise and lower said parison mold, means connected to said second motor means for selectively actuating it to effect reciprocation of said second motor to open and close said parison mold, means interconnecting said last two-mentioned means for delaying the relative actuation of said motor means in a sequence so that the second motor means is operated before the first motor means, after the forming of the parison, and the first motor means is operated before the second motor means when raising the parison mold into forming position, means for feeding charges of molten glass to said split mold when closed, means for pressing the parison within said closed mold, means connected to said turret for transferring the formed parison to a blow station, and means at said blow station for expanding said parison into final bottle form.

2. Narrow neck ware forming apparatus comprising a base, a horizontal rotatable turret, at least two sets of neck molds mounted on said turret above said base and circumferentially spaced thereon corresponding to the operating stations of said apparatus, a two-piece split narrow neck parison mold adapted to open and close in vertical alignment with one of said sets of neck molds, vertically positioned fluid motor means mounted on said base and supporting said parison mold, a second motor means connected to said parison mold for opening and closing said mold, a source of fluid under pressure, a first valve means for selectively connecting said source of fluid to said first motor to reciprocably actuate said first motor, a second valve means connected between said source and said second motor, said valve being shiftable to effect reciprocation of said second motor, fluid means for shifting said valves, means connected in said fluid means for delaying the relative shifting of said valves so that the second motor is operated before the first motor, after the forming of the parison, and the first motor is operated before the second motor when moving the parison mold into forming position, means for feeding charges of molten glass to said split mold when closed, means for pressing the parison within said closed mold, means connected to said turret for transferring the formed parison to a blow station, and means at said blow station for expanding said parison into final bottle form.

3. The apparatus as defined in claim 2 wherein said source of fluid is a hydraulic fluid under pressure.

4. The apparatus as defined in claim 2 wherein said fluid means for shifting said valve includes a pair of conduits adapted to be alternately connected to a pressure source and exhaust port, means connecting one of said conduits to said first valve for shifting said valve in one direction to a first position, means connecting the other conduit to said second valve for shifting said valve in one direction to a first position, wherein said means for delaying the relative shifting of said valves comprises a third fluid actuated spool valve having a pair of axially displaced under-cut portions, a valve body surrounding said valve and having two pairs of axially displaced annular chambers, with each pair of chambers being connected by an undercut portion of said spool valve upon reciprocation of said valve spool, a piston head formed on one end of said spool valve, a cylinder formed in said valve body within which said piston head is reciprocable, means connecting said pair of conduits to respective ends of said cylinder, valve means in each said connecting means permitting unrestricted flow in one direction and restricting flow in the other direction, whereby said third valve is controlled as to its rate of movement, means connecting one of said pair of conduits to one of each pair of chambers and means connecting the other chambers of said pairs of chambers respectively to said first and second valves for shifting said valves in their other direction to a second position, whereby said first and second valves are controlled as to their rate of relative operation.

References Cited in the file of this patent

UNITED STATES PATENTS

| | | |
|---|---|---|
| 687,595 | Blue | Nov. 26, 1901 |
| 851,163 | Cox | Apr. 23, 1907 |
| 919,120 | Bock | Apr. 20, 1909 |
| 1,052,902 | Dorsey | Feb. 11, 1913 |
| 1,149,857 | Rau | Aug. 15, 1915 |
| 1,197,837 | Loper et al. | Sept. 12, 1916 |
| 1,292,051 | Rau | Jan. 21, 1919 |
| 1,333,143 | Wadsworth | Mar. 9, 1920 |
| 1,512,372 | Soubier | Oct. 21, 1924 |
| 1,727,221 | Searle | Sept. 3, 1929 |
| 1,764,166 | Hewitt | June 17, 1930 |
| 1,876,005 | Hoge et al. | Sept. 6, 1932 |
| 1,888,440 | Waughn | Nov. 22, 1932 |
| 1,898,408 | Treece et al. | Feb. 21, 1933 |
| 2,134,342 | Roirant | Oct. 25, 1938 |
| 2,289,046 | Rowe | July 7, 1942 |
| 2,669,805 | Rowe | Feb. 23, 1954 |
| 2,757,485 | Fedevich | Aug. 7, 1956 |
| 2,834,155 | Allen | May 13, 1958 |
| 2,888,131 | Allen | May 26, 1959 |
| 2,926,457 | Trudeau | Mar. 1, 1960 |